United States Patent [19]

Tieleman

[11] 4,435,878
[45] Mar. 13, 1984

[54] POULTRY EVISCERATING TOOL

[76] Inventor: Rudolf J. Tieleman, Broekhuizerweg 6, 6983 BM Doesburg, Netherlands

[21] Appl. No.: 460,432

[22] Filed: Jan. 24, 1983

[51] Int. Cl.³ .............................................. A22C 21/06
[52] U.S. Cl. ........................................................ 17/11
[58] Field of Search .............................................. 17/11

[56] References Cited

U.S. PATENT DOCUMENTS

| 1,984,562 | 12/1934 | Ashby | 17/11 |
| 3,979,793 | 9/1976 | Hazenbroek | 17/11 |
| 4,019,222 | 4/1977 | Scheier et al. | 17/11 |
| 4,382,314 | 5/1983 | Graham | 17/11 |

*Primary Examiner*—Willie G. Abercrombie
*Attorney, Agent, or Firm*—Beveridge, DeGrandi and Kline

[57] ABSTRACT

A system for eviscerating poulty carcasses including a movable conveyor (10) having shackles (18) for suspending the carcasses by their hocks, means (12) for supporting the conveyor at an elevated height, means for moving the conveyor to move the carcasses along a processing line, means (27) below the conveyor for supporting the breasts of carcasses to be eviscerated, and a plurality of tools (28) mounted on a carousel (14) for eviscerating the carcasses by entering the body cavities of the carcasses from rear access openings, each tool including a shaft (42) and a loop member (44) mounted on the shaft the loop being vertically elongated and being formed of two symmetrical interconnected halves (46, 48) which lie on opposite sides of a central plane (47), each of the halves of the loop including an upper portion (50), an intermediate portion (52), a lower portion (53), and a bottom (54), each upper portion extending downwardly from the shaft in a direction which diverges from the central plane, each intermediate portion extending downwardly from the upper portion in a direction which converges toward the central plane, each lower portion extending downwardly from the intermediate portion toward the central plane, and each bottom extending from the lower portion to the central plane and having a center of curvature located in the central plane and a radius (y) which is less than the distance (x) from the central plane to the lower end (51) of the upper portion.

8 Claims, 4 Drawing Figures

FIG. 2
FIG. 3
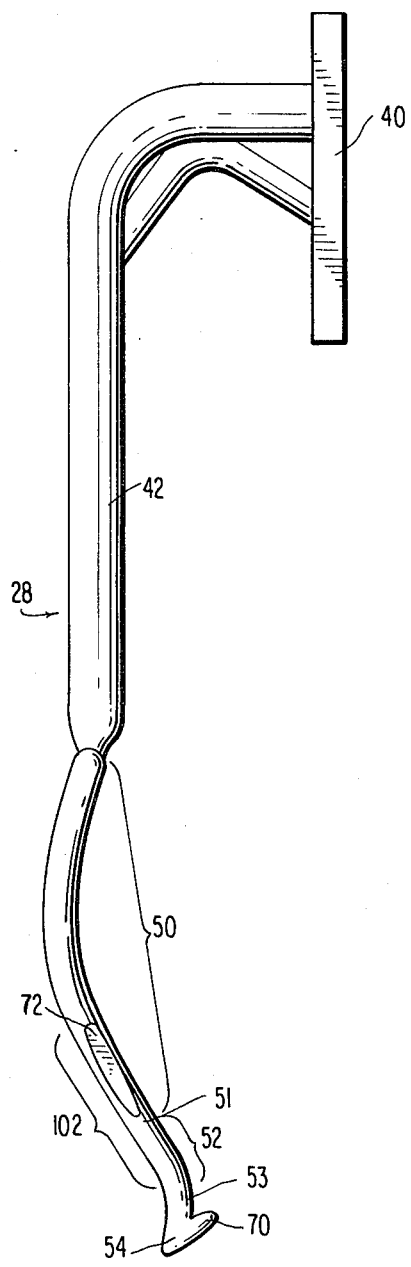
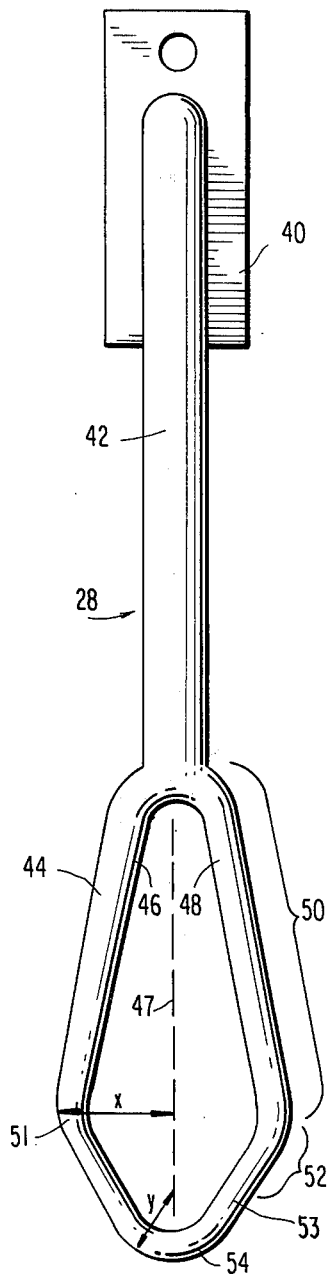

POULTRY EVISCERATING TOOL

BACKGROUND OF THE INVENTION

The present invention relates to poultry eviscerating apparatus, and includes improvements in automatic apparatus for use in poultry processing plants.

Chickens and other fowls being slaughtered for market must be eviscerated not only because consumers demand eviscerated poultry, but also because the United States Department of Agriculture inspection requirements include inspection of the viscera of slaughtered fowl to prevent diseased poultry from entering the market. Accordingly large quantities of poultry are eviscerated daily, typically in highly automated processing plants.

In such plants, the carcasses are transported from one processing station to another by means of a conveyor mechanism in which the hocks, the distal ends of the legs, are suspended from a shackle attached to the conveyor. Evisceration is performed at a suitable station.

Many machines have been devised for eviscerating poultry being transported along a conveyor line. Examples of such conveyorized systems are shown in the following U.S. patents:

| U.S. PAT. NO. | NAMED INVENTOR |
| --- | --- |
| 3,474,492 | Viscolosi |
| 3,555,593 | Scheier |
| 3,653,093 | Scheier |
| 3,663,991 | Harben, Jr. |
| 3,685,096 | Harben, Jr. |
| 3,798,708 | Scheier |
| 3,902,221 | Harben, Jr. et al. |

Another eviscerating machine which cooperates with a conveyor line is shown in U.S. Pat. No. 3,979,793 issued Sept. 14, 1976 to Jacobus E. Hazenbroek. The entire disclosure thereof is incorporated herein by reference. In the Hazenbroek machine the chickens are transported by the conveyor to the machine, which is a carousel structure located on the conveyor line. The carcasses are brought to the machine suspended by their hocks, with their backs toward the carousel. As the carcasses travel around the carousel, a clamping fork elevates underneath the carcasses to support the breasts thereof. An eviscerating tool then enters the body cavity of the carcass from the rear, through the vent or an enlargement thereof and scoops the viscera out, so that they can be inspected and severed from the rest of the carcass.

Another machine employing a carousel is the Evisomate Eviscerator manufactured by Lindholst and Company A/S, dk-8280 Trige, Denmark. In the Lindholst machine, the eviscerating tool has a shaft and a loop arrangement. The shaft extends vertically downwardly toward the vent of the chicken and the loop is angled back towards the carousel of the machine. The shaft can be pivoted to cause its upper end to lean toward the machine, thereby bringing the loop close to vertical. In this position the tool is lowered into the body cavity of the carcass. On its downward movement, the tool scrapes and loosens the viscera from the breast side of the cavity. As the tool moves downwardly, the shaft is pivoted towards vertical so that the loop angles back toward the carousel. Then the tool is moved vertically upwardly, causing the end of the loop to scrape the inside of the back, along the ribs and backbone, loosening and removing the viscera. At the top of its travel, the tool pivots back so that the upper end of the shaft is angled toward the carousel, releasing the viscera. The viscera droop over the back of the carcass and are available for inspection and severing. The present invention is uniquely adapted to replace the eviscerating tool of the prior Lindholst machines.

One such tool previously used in machines such as the Hazenbroek machine is depicted in U.S. Pat. No. Des. 256,802 to Hazenbroek.

Other means have, of course, been used to eviscerate birds, notably hand operated devices, as shown in U.S. Pat. No. 1,984,562 to Ashby; U.S. Pat. No. 2,508,957 to Lynn; U.S. Pat. No. 2,533,455 to Finney; and U.S. Pat. No. 2,547,608 to Toti et al.

It is important when eviscerating poultry not to damage the viscera, because ruptured organs can contaminate the meat, and are themselves less marketable as food products. Accordingly, the complete removal of the viscera without damage is of prime importance. The most valuable of the viscera of a chicken is the liver, and so its removal without damage is especially desirable.

Prior apparatus has not been completely satisfactory in this respect. One primary problem has been the irregular shape of the body cavity of the poultry. Prior eviscerating tools have attempted without success to accommodate the shape of this body cavity. The present invention uniquely fits the shape of the body cavity to allow the complete removal of the viscera without damage in the vast majority of cases. As a result the present invention substantially increases the yield of undamaged livers.

Additionally, prior art devices have had problems in achieving lung removal. With the present invention, complete lung removal is accomplished in up to 96% of the carcasses.

SUMMARY OF THE INVENTION

The present invention provides a tool for eviscerating a poultry carcass by entering the body cavity of the carcass from a rear access opening. The tool includes a shaft and a loop member mounted on the shaft, the loop being vertically elongated and being formed of two symmetrical interconnected halves which lie on opposite sides of a central plane. Each of the halves of the loop includes an upper portion, an intermediate portion, a lower portion and a bottom. Each upper portion extends downwardly from the shaft in a direction which diverges from the central plane, and each intermediate portion extends downwardly from the upper portion in a direction which converges toward the central plane. Each lower portion extends downwardly from the intermediate portion toward the central plane, and each bottom extends from the lower portion to the central plane and has a center of curvature located in the central plane and a radius which is less than the distance from the central plane to the lower end of the upper portion. When viewed from a side thereof, the loop has its lower portions and bottoms located in a plane perpendicular to the central plane and has its upper and intermediate portions bowed in a forward direction and located forwardly of the plane of the lower portions and bottoms.

The two lower portions and bottoms form a lower section, the two upper portions form an upper section, and the two intermediate portions form an intermediate section. The maximum width of the lower section is about three centimeters, and the maximum width of the upper section is about seven centimeters. The length of the loop approximates the length of the body cavity of the carcass to be eviscerated. The length of the upper portion is about three-fourths the length of the loop.

Preferably, the length of the upper portion is about 10½ centimeters, the length of the lower portion is about two centimeters and the length of the entire loop is about 14½ centimeters. Each lower portion has a tooth extending rearwardly therefrom.

The invention includes a system for eviscerating poultry carcasses including a movable conveyor having shackles for suspending the carcasses by their hocks, means for supporting the conveyor at an elevated height, means for moving the conveyor to move the carcasses along a processing line, means below the conveyor for supporting the breasts of carcasses to be eviscerated, and a carousel having a plurality of eviscerating tools as described above.

BRIEF DESCRIPTION OF THE DRAWINGS

The invention will be better understood after a reading of the detailed description of the invention along with a study of the drawings in which:

FIG. 2 is a side elevation of the eviscerating tool;

FIG. 3 is a front elevation of the eviscerating tool;

DETAILED DESCRIPTION OF A PREFERRED EMBODIMENT

Figure 1:
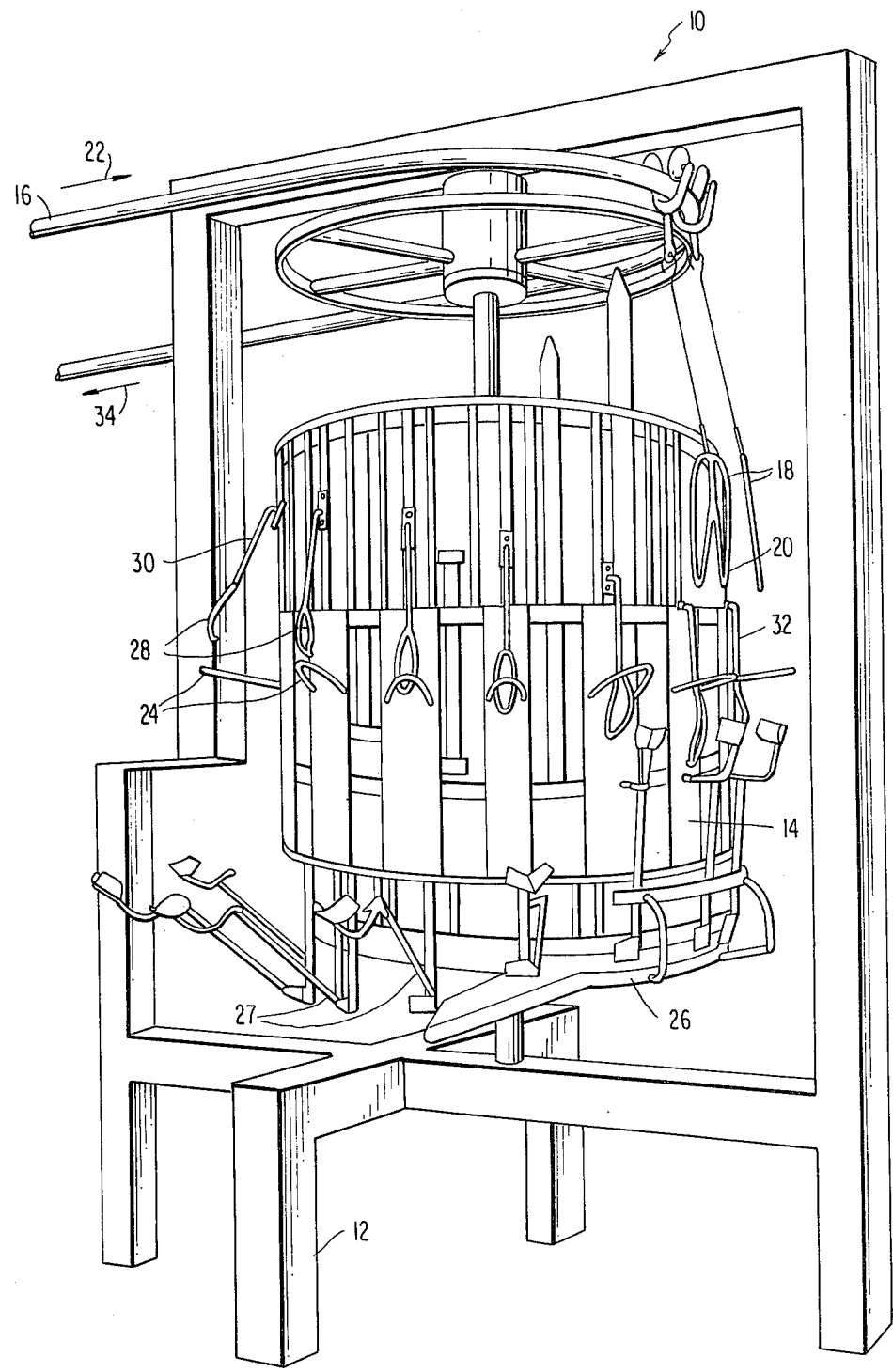
FIG. 1 is a perspective view of a carousel-type eviscerating machine equipped with the new eviscerating tool.

As can be seen in FIG. 1, a carousel-type eviscerator 10 has a base 12 which rotatably supports the carousel 14. The carousel 14 is driven by a conveyor assembly 16 of conventional design. The conveyor assembly includes a multiplicity of depending shackles 18, only two of which are shown in the drawing for the sake of clarity. Each shackle 18 has two bent rod loops 20, each of which can support one of the two hocks of a carcass. Thus a carcass is conveyed around the carousel 14 by a shackle 18 driven by conveyor assembly 16. The conveyor brings in carcasses to be eviscerated from left to right as designated by arrow 22 with their backs towards carousel 14. As the carcasses approach the eviscerator 10, the body portions of the carcasses are forced under loops 24, with their vents, or a pre-made access opening exposed to the top through the loop. A stationary cam arrangement 26 is provided for urging breast support members 27 upwardly under the carcasses to support them against loops 24.

For each breast support member 27 there is provided an eviscerating tool 28 thereabove as can be seen in FIG. 1. Another cam arrangement (not shown) causes the tools 28 to move vertically as the carousel 14 rotates. The eviscerating tools 28 are also pivotable from an angular shaft position 30 to a parallel shaft position 32. This pivoting is controlled by a cam arrangement on the carousel, not shown. The pivoting from position 30 to position 32 is gradual, and the parallel shaft position 32 is reached when the tool 28 is in its lowermost position, as seen in FIG. 1.

Upon further rotation of the carousel 14, the eviscerating tool is urged straight upwardly in its parallel shaft position until is has exited the body cavity of the carcass. It then is pivoted to its angular shaft position 30 releasing the viscera over the back of the carcass. The eviscerated carcass then leaves along conveyor assembly 16 in the direction of arrow 34 for inspection and further processing. The eviscerating tool 28 is cleaned and the breast support members 27 retract to their lower position on the opposite side of carousel 14 from that shown in FIG. 1.

FIGS. 2 and 3 show the eviscerating tool 28 in greater detail. The tool 28 is made of stainless steel so that sanitary conditions can be easily maintained without creating corrosion problems.

The tool 28 includes mounting plate 40 for attachment of shaft 42 to the carousel-type eviscerator 10. Connected to shaft 42 is a loop 44 having two elongated halves 46 and 48 which are mirror images of another, creating a bilateral symmetry about a central plane 47.

Each of halves 46 and 48 has an upper portion 50, an intermediate portion 52, a lower portion 53 and a bottom 54. As will be apparent from FIG. 3, each upper portion 50 extends downwardly from shaft 42 in a direction which diverges from the central plane 47. The widest part of the loop is located at the lower end 51 of the upper portion. Lower end 51 is separated from central plane 47 by a distance x, about half the width of the widest portion of the body cavity of the carcass to be eviscerated. Each intermediate portion 52 extends downwardly from its respectively upper portion 50 in a direction which converges toward the plane 47. Each lower portion 53 extends downwardly from its respective intermediate portion towards the plane 47 but more parallel to shaft 42 than the intermediate portion 52. Each bottom 54 mates with the opposed bottom at the central plane 47.

Each of the bottoms 54 is curved and has a center of curvature located in the central plane and a radius of curvature y which is less than the distance x between the central plane and the lower end 51 of the upper portion 50.

Referring to FIG. 2, a side view of the tool, it can be seen that the lower portions 53 and the bottoms 54 of the loop lie in a plane substantially perpendicular to central plane 47. The upper and intermediate portions 50 and 52 of the loop are bowed in a forward direction (to the left in FIG. 2) and are located forwardly of the plane of lower portions 53 and the bottoms 54. The result is the formation of a bowl portion 102.

The loop is provided to be of a size such that its length approximates the length of the body cavity of the carcass to be eviscerated. The upper portions 50 of the loop extend for about three-fourths of the entire length of the loop. For processing chickens of the usually marketed size (i.e. 3 pounds and above live weight), it has been found that a loop having an overall length of about 14½ centimeters is suitable. The length of the upper portions is about 10½ centimeters and the length of the lower portions and bottoms is about two centimeters. The width at the widest section, that is a distance of 2×, is preferably about seven centimeters. The width of the lower section, made up of the two bottoms, is preferably about three centimeters.

A tooth 70 is provided on each bottom 54 extending rearwardly therefrom, toward mounting plate 40.

Although the shaft 42 and the loop 44 are generally of circular cross section, loop 44 is provided with a flattened outer face 72 on each upper portion. In general, the cross sectional area of the upper portions 50 is greater than that of the intermediate portion 52, the lower portion 53 and the bottom 54.

The unique shape of the loop of the eviscerating tool allows it to interfit with the body cavity of a poultry carcass to provide efficient evisceration without damaging the meat or the viscera.

Figure 4:
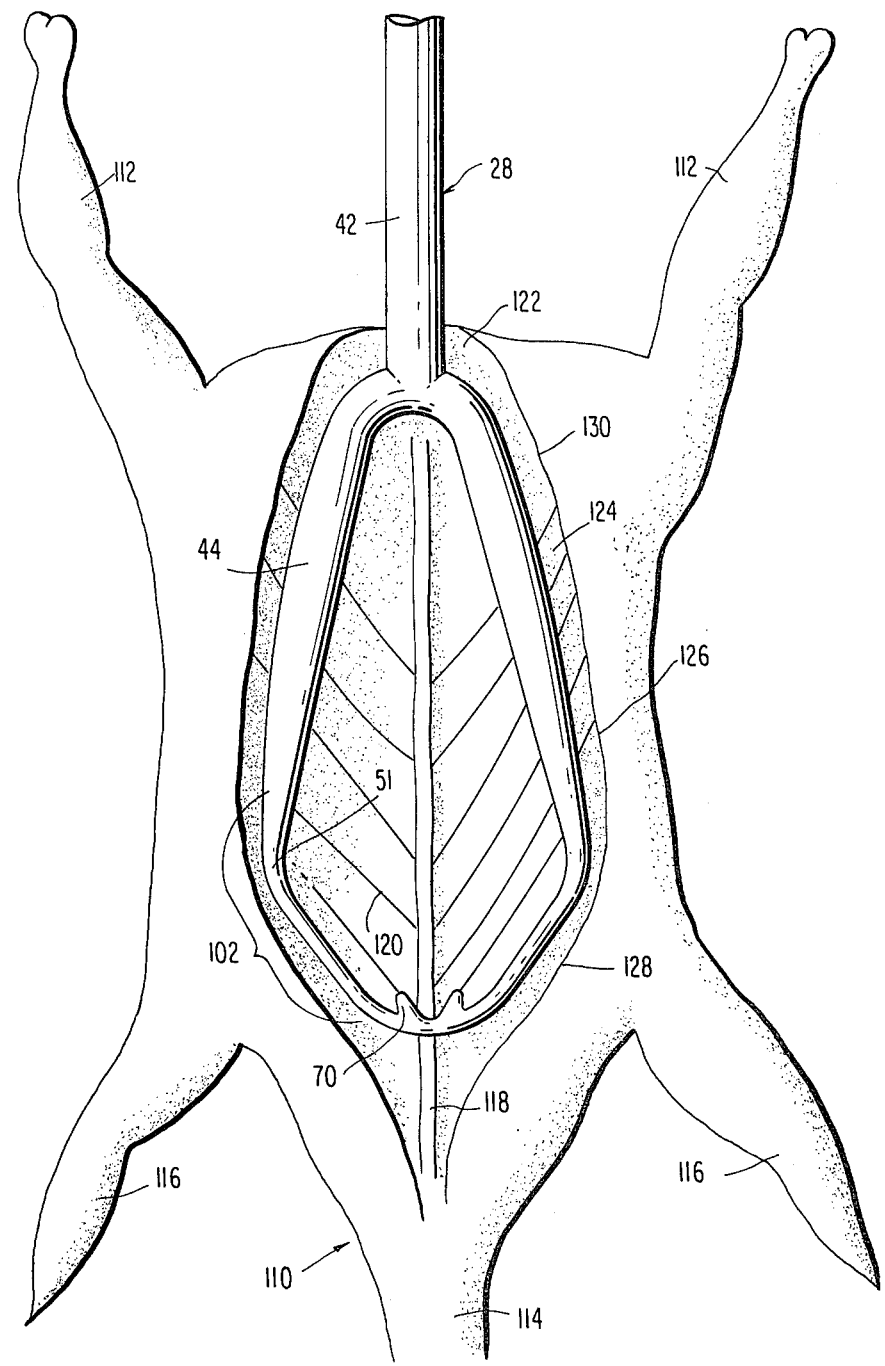
FIG. 4 is a schematic view of the relationship of the eviscerating tool to the body cavity of a chicken.

This feature can be seen in FIG. 4 in which a killed, cleaned, dressed and eviscerated chicken can be seen schematically with the eviscerating tool therein. The chicken 110 is suspended from its hocks 112, so that its neck 114 and wings 116 hang downwardly. The backbone 118 and ribs 120 can be seen defining the body cavity of the chicken 110. Typically the body cavity is entered from the vent or an enlargement thereof 122 for evisceration. At the rear near the vent 122, the carcass has a substantial flexibility to accommodate the widest portion 51 of tool 28. Thus although in its unstressed state, the body cavity has a size and shape as shown in FIG. 4, the area near the vent can be stretched sideways to allow the tool 28 to enter.

The body cavity 124 is tapered from a widest portion 126 toward the neck 114 and toward vent 122. A particularly significant narrowing occurs at 128 as the wing joints constrict the size of the body cavity. Another significant narrowing occurs at 130 due to the legs. Accordingly, an eviscerating tool having a single width, or a single predominant width, does not effectively eviscerate the chicken in one pass. Prior tools narrow enough to travel into the constricted area 128 between the wings leave untouched the widest portion 126 of the cavity. On the other hand, tools designed to extend to the widest portion 126 cannot penetrate to the constricted area 128.

When mounted on an apparatus such as the Lindholst Evisomate eviscerator, the tool 28 enters the body cavity with the bowl portion 102 moving substantially parallel to the length of the body cavity, down the breast side of the body cavity.

Near the end of its downward movement, the tool 28 pivots so that the shaft 42 is substantially vertical and the bowl portion 102 is angled to the vertical, as shown in FIG. 2. As the tool 28 moves upwardly from this position the teeth 70 scrape the lungs from the backbone 118 and ribs 120. The bowl portion 102, being widened and extending toward mounting plate 40, acts as a peripheral rim to collect and suspend the viscera as the tool leaves the body cavity, thus giving them peripheral, rather than direct, support. This gentle urging results in the intact removal of the viscera, particularly the liver.

The eviscerating tool of the present invention can easily be adapted to preexisting eviscerating machines, such as the aforementioned Lindholst Evisomate. The mounting plate 40 is configured the same as the mounting plate of prior eviscerating tools.

Accordingly, it will be seen that the present invention provides a significant advantage in quick and thorough evisceration of chicken, without damaging the viscera.

The tool can, of course, be modified in size to eviscerate other poultry such as cornish hens, ducks, geese, guinea hens and the like, as desired.

What is claimed is:

1. A tool for eviscerating a poultry carcass by entering the body cavity of the carcass from a rear access opening, said tool comprising a shaft and a loop member mounted on said shaft, said loop being vertically elongated and being formed of two symmetrical interconnected halves which lie on opposite sides of a central plane, each of said halves of the loop including an upper portion, an intermediate portion, a lower portion and a bottom, each said upper portion extending downwardly from the shaft in a direction which diverges from the central plane, each said intermediate portion extending downwardly from the upper portion in a direction which converges toward the central plane, each said lower portion extending downwardly from the intermediate portion towards the central plane, and each said bottom extending from the lower portion to the central plane and having a center of curvature located in said central plane and a radius which is less than the distance from the central plane to the lower end of the upper portion.

2. A tool as claimed in claim 1 wherein the loop, when viewed from a side thereof, has its lower portions and bottoms located in a plane substantially perpendicular to said central plane and has its upper and intermediate portions bowed in a forward direction and located forwardly of the plane of said lower portions and bottoms.

3. A tool as claimed in claim 1 wherein each bottom has a tool extending rearwardly therefrom.

4. A tool as claimed in claim 1 wherein the length of the loop approximates the length of the body cavity of the carcass to be eviscerated.

5. A tool as claimed in claim 1 wherein the length of the upper portion is about three-fourths the length of the loop.

6. A tool as claimed in claim 1 wherein the two lower portions and bottoms form a lower section, the two upper portions form an upper section, and the two intermediate portions form an intermediate section, the maximum width of the lower section is about three centimeters and the maximum width of the upper section is about seven centimeters.

7. A tool as claimed in claim 6 wherein the length of the upper portion is about $10\frac{1}{2}$ centimeters and the length of the entire loop is about $14\frac{1}{2}$ centimeters.

8. A system for eviscerating poultry carcasses comprising (a) a movable conveyor having shackles for suspending the carcasses by their hocks,
   (b) means for supporting said conveyor at an elevated height,
   (c) means for moving said conveyor to move the carcasses along a processing line,
   (d) means below said conveyor for supporting the breasts of carcasses to be eviscerated, and
   (e) a plurality of tools mounted on a carousel for eviscerating the carcasses by entering the body cavities of the carcasses from rear access openings, each said tool comprising
      1. a shaft and a loop member mounted on said shaft said loop being vertically elongated and being formed of two symmetrical interconnected halves which lie on opposite sides of a central plane,
      2. each of said halves of the loop including an upper portion, an intermediate portion, a lower portion and a bottom, each said upper portion extending downwardly from the shaft in a direction which diverges from the central plane, each said intermediate portion extending downwardly from the upper portion in a direction which converges toward the central plane, and each said lower portion extending downwardly from the intermediate portion towards the central plane, and each said bottom extending from the lower portion to the central plane and having a center of curvature located in said central plane and a radius which is less than the distance from the central plane to the lower end of the upper portion.

* * * * *